United States Patent
Waldon

(10) Patent No.: US 10,132,488 B1
(45) Date of Patent: Nov. 20, 2018

(54) SYSTEM AND METHOD FOR PROVIDING LED LIGHTING

(71) Applicant: Mark Q. Waldon, Parker, CO (US)

(72) Inventor: Mark Q. Waldon, Parker, CO (US)

(73) Assignee: Light Evolution Designs LLC, Reedsburg, WI (US)

( * ) Notice: Subject to any disclaimer, the term of this patent is extended or adjusted under 35 U.S.C. 154(b) by 154 days.

(21) Appl. No.: 14/817,895

(22) Filed: Aug. 4, 2015

(51) Int. Cl.
| | |
|---|---|
| *F21V 29/83* | (2015.01) |
| *F21V 21/008* | (2006.01) |
| *F21V 19/00* | (2006.01) |
| *F21V 29/89* | (2015.01) |
| *F21V 3/02* | (2006.01) |
| *F21V 23/06* | (2006.01) |
| *F21W 131/109* | (2006.01) |
| *F21Y 111/00* | (2016.01) |
| *F21Y 103/00* | (2016.01) |

(52) U.S. Cl.
CPC ............... *F21V 29/83* (2015.01); *F21V 3/02* (2013.01); *F21V 19/001* (2013.01); *F21V 21/008* (2013.01); *F21V 23/06* (2013.01); *F21V 29/89* (2015.01); *F21W 2131/109* (2013.01); *F21Y 2103/003* (2013.01); *F21Y 2111/005* (2013.01)

(58) Field of Classification Search
CPC ............................... F21V 29/83; F21V 21/008
See application file for complete search history.

(56) References Cited

U.S. PATENT DOCUMENTS

| | | | |
|---|---|---|---|
| 3,701,897 A * | 10/1972 | Pennington | F21V 5/06 362/278 |
| 5,688,042 A | 11/1997 | Madadi et al. | |
| 6,762,562 B2 | 7/2004 | Leong | |
| 7,049,761 B2 | 5/2006 | Timmermans et al. | |
| 7,220,024 B1 * | 5/2007 | Berends | F21L 14/02 362/109 |
| 7,249,877 B2 | 7/2007 | Johnson et al. | |
| 7,434,964 B1 * | 10/2008 | Zheng | F21V 29/006 362/218 |
| 7,507,001 B2 | 3/2009 | Kit | |
| 7,806,563 B1 | 10/2010 | Bruck et al. | |
| 7,905,634 B2 | 3/2011 | Agurok et al. | |
| 8,123,378 B1 | 2/2012 | Ruberg et al. | |
| 8,360,613 B2 | 1/2013 | Little, Jr. | |
| 8,864,332 B2 | 10/2014 | Ter-Hovhannisyan | |
| 8,888,314 B2 | 11/2014 | Gill | |
| 2005/0269581 A1 * | 12/2005 | Dry | F21K 9/00 257/88 |
| 2006/0072320 A1 | 4/2006 | Coushaine et al. | |
| 2006/0120104 A1 * | 6/2006 | Iwasa | F21S 4/26 362/576 |

(Continued)

*Primary Examiner* — Karabi Guharay
*Assistant Examiner* — Zachary J Snyder
(74) *Attorney, Agent, or Firm* — Ramon L. Pizarro

(57) ABSTRACT

A system for supporting light emitting diodes (LEDs) for providing light to promote plant growth is disclosed. The system provides a tube or cylinder with various facets that provide support surfaces for strips of LEDs. The tubular shape promotes the creation of a flow of air along the tube or cylinder to enhance heat transfer though convection. The system also allows positioning of the lights along the length of plants, and thus avoiding issues associates with providing light to just the highest leaves of the plant.

3 Claims, 2 Drawing Sheets

(56) References Cited

U.S. PATENT DOCUMENTS

| | | | | |
|---|---|---|---|---|
| 2007/0230184 | A1* | 10/2007 | Shuy | F21K 9/00 |
| | | | | 362/294 |
| 2009/0073689 | A1* | 3/2009 | Patrick | F21V 15/01 |
| | | | | 362/234 |
| 2009/0116233 | A1* | 5/2009 | Zheng | F21S 2/005 |
| | | | | 362/234 |
| 2009/0257226 | A1* | 10/2009 | Liu | F21V 31/005 |
| | | | | 362/249.02 |
| 2009/0267519 | A1* | 10/2009 | Pearse | F21V 19/00 |
| | | | | 315/117 |
| 2010/0208457 | A1* | 8/2010 | Keal | F21S 8/086 |
| | | | | 362/234 |
| 2011/0085322 | A1* | 4/2011 | Myer | F21S 8/083 |
| | | | | 362/183 |
| 2012/0020071 | A1 | 1/2012 | McKenzie | |
| 2013/0128565 | A1* | 5/2013 | Cugini | F21V 21/145 |
| | | | | 362/184 |
| 2015/0103525 | A1* | 4/2015 | Rowley | F21K 9/90 |
| | | | | 362/249.06 |

* cited by examiner

SYSTEM AND METHOD FOR PROVIDING LED LIGHTING

REFERENCE TO RELATED APPLICATIONS

This application claims the benefit of provisional application having Ser. No. 61/998,663, filed on Aug. 6, 2014, which is incorporated herein in its entirety by reference.

BACKGROUND OF THE INVENTION (a) Field of the Invention

This application relates to a system and method for supporting and providing light from LEDs (light emitting diodes). More particularly, but not by way of limitation, to a system and device that supports strips of LEDs and allows support of the device over a desired area to be illuminated, and allows the user to replace the LED strips without replacing the support device.

(b) Discussion of Known Art

The use of LED lighting for growing plants has been recognized as a viable alternative to traditional methods of using artificial lights to grow plants. A particular advantage of the use of LED lighting is that LEDs can be fabricated to provide specific light spectrum that will favor growth or development in a desired plant variety. Examples of publications that discuss these known aspects of LEDs and their use in horticulture are discussed in WIPO publication WO 2014013400 A2, which is incorporated herein by reference in its entirety, and in U.S. Application Publication US20130326947 A1, which is incorporated herein by reference in its entirety.

Problems associated with the use of LEDs is that LEDs will produce light that is concentrated along a narrow wavelength spectrum. Therefore, in order to create a light source that is favorable for plants, or a specific type of plant, requires a mixture of various types of LEDs, each producing a specific portion of the desired light spectrum. Thus, a grow light that provides light in a variety light spectrums typically requires the use of a variety of LEDs clustered together. This clustering of LEDs creates problems associated with the dissipation of heat generated by the operation of the closely spaced LEDs.

Still further, known devices that use LEDs typically follow the approach used in providing fluorescent lighting, which is the use of long, horizontally supported, light fixtures. Examples of this approach are found in U.S. Pat. No. 8,864,332 to Ter-Hovhannisyan, and U.S. Pat. No. 8,360,613 to Little, Jr. The horizontal support facilitates cooling in that the air surrounding these lights rises as it is heated by the LEDs. Accordingly, these devices use horizontal cooling fins and provide arrangements that promote cooling with the horizontal fins.

An important disadvantage of using horizontally supported lighting systems is that the light generated reaches the tops of the plants being cultivated, but the leaves and structure of these plants blocks the light from the lower portions of the plants.

Therefore, a review of known devices reveals that there remains a need for a simple device that can accommodate a large variety of LEDs, provide efficient cooling for the device, and which allows the light generated to reach along the entire plant.

SUMMARY

It has been discovered that a system that uses an elongated hollow metal, conductive, tube with flats along its length can be used to support LED ribbons. Heat generated by the operation of the LEDS is dissipated through the hollow tube, which benefits from convection created by the heating of the air within the tube. They system is preferably hung vertically, which allows the lights to be places along side of the plants or over the plants as traditionally done.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figures 1, 1A:
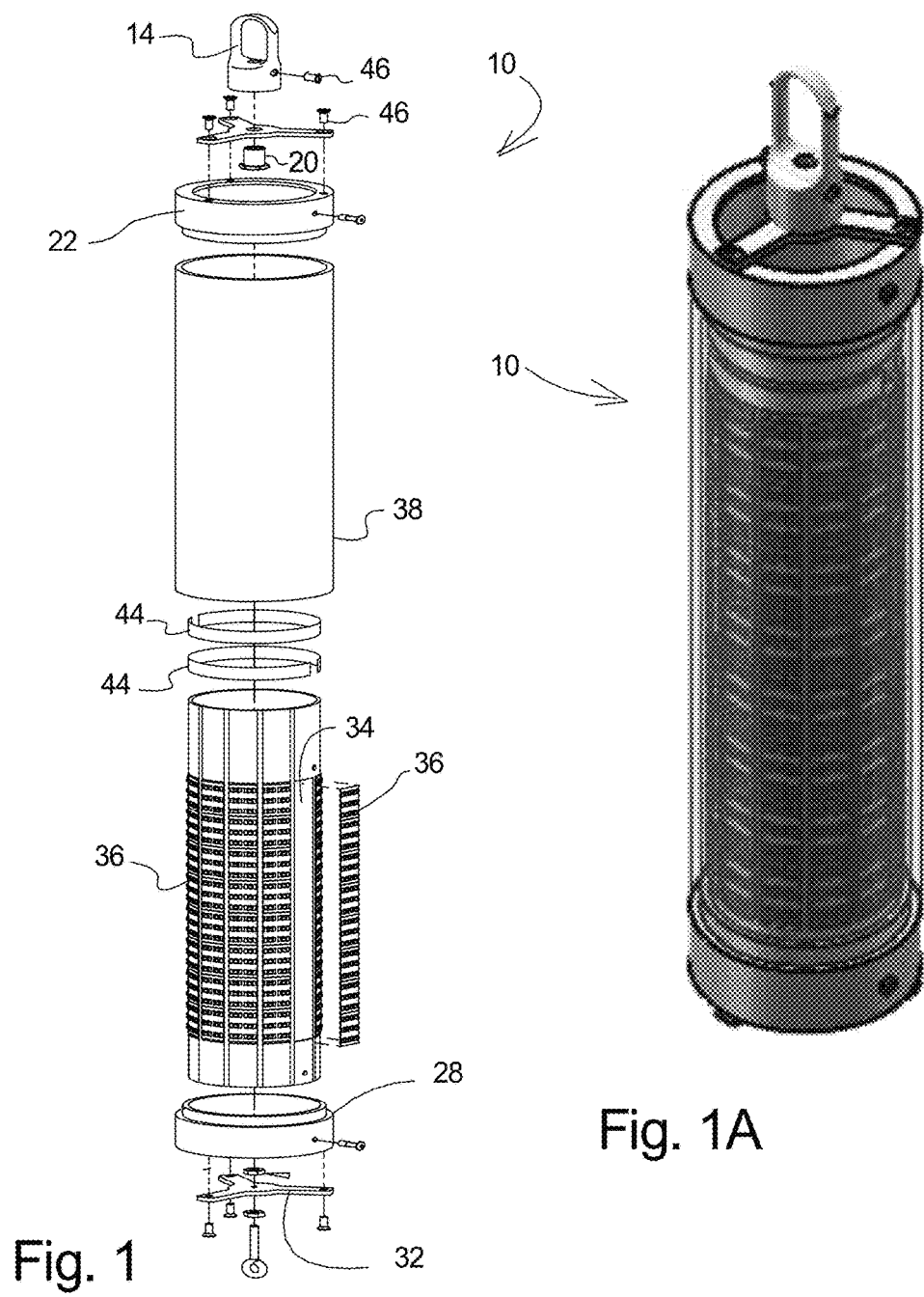
FIG. 1 is a perspective, exploded view illustrating components used with the disclosed invention.
FIG. 1A is perspective view of an assembled embodiment with a transparent tube that extends over the hollow metal tube of the disclosed invention.

Turning now to FIG. 1 where a system 10 for supporting an array of illuminated LEDs and removing heat generated from the array of illuminated LEDs positioned next to a plant has been illustrated. FIG. 1 shows that a preferred example of the disclosed invention an elongated hollow metal tube 12 that is supported from an eye 14. It is preferred that the eye 14 will be centered over an opening 16 in the upper end 18 of the elongated hollow metal tube 12.

Figure 2:
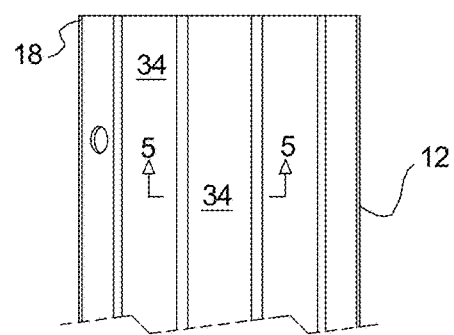
FIG. 2 illustrates an example of the hollow metal tube used with the disclosed invention.
Figure 3:
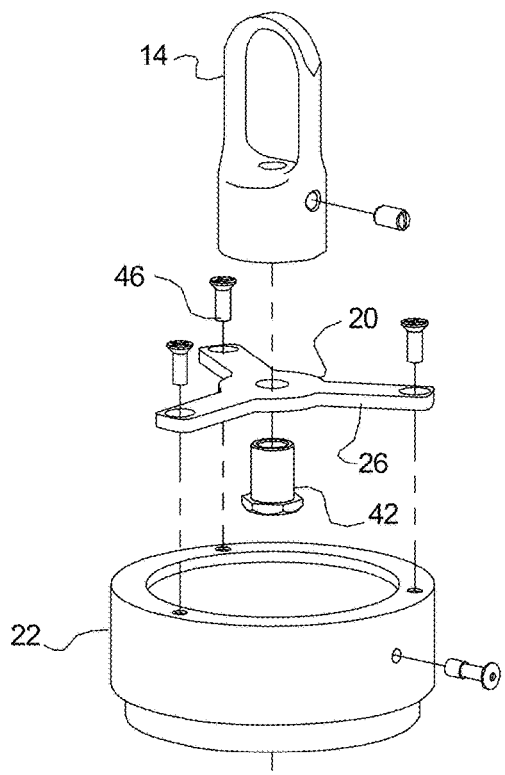
FIG. 3 illustrates a preferred example of an upper flange that attaches to the upper end of the elongated hollow metal tube, and which is also used to support an eye that allows suspension of the assembly. The view also shows the use of a grommet that mounts within an upper support spacer that is used to support the eye and the upper flange.
Figure 4:
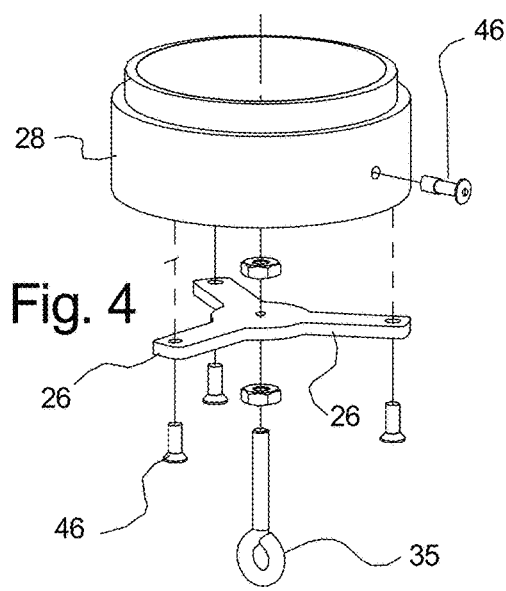
FIG. 4 illustrates a lower flange, which in a preferred example is the same as the upper flange, and attaches to the lower end of the elongated hollow metal tube. The upper flange and the lower flange are also used to secure a transparent tube that extends over the elongated hollow metal tube that is used to support LEDs.

Turning to FIGS. 2-4 it will be understood that the eye 14 will preferably be mounted from a support spacer 20 that is in turn mounted from an upper flange 22. The upper flange 22 is secured to the upper end 18 of the elongated hollow metal tube 12. As shown in FIG. 3, the upper flange 22 will preferably include spokes 26 that attach to the upper flange 22. The spokes 26 will allow warm air that may be found inside the elongated hollow metal tube 12 to escape, and thus cooling the elongated hollow metal tube 12.

It will be understood from viewing FIG. 4 that the lower flange 28 that attaches to the lower end 30 of the elongated hollow metal tube 12 is of the same configuration as the upper flange 22, and cooperates with a lower support spacer 32 that is of the same configuration as the upper support spacer 20. Also shown on FIG. 4 is an optional lower eye 35 that can be used to support the disclosed invention at an angle, or used to attach several of the disclosed devices in a daisy chain, in order to provide illumination along the length of tall plants.

Figure 5:
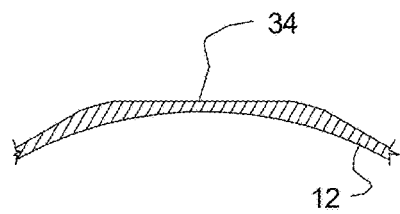
FIG. 5 is a section taken along the arrows 5-5 of FIG. 2, looking in the direction of the arrows, and show the planar surfaces that extend from the lower end to the upper end of the hollow metal tube.

Referring now to FIGS. 2 and 5 it will be understood that a preferred example of the disclosed invention will include flat surfaces 34 along the length of the elongated hollow metal tube 12. The flat surfaces 34 will accommodate and support LEDs, preferably LED strips 36 that include LEDs that are mounted along a conductive ribbon that can simply be fastened or adhered to the flat surfaces 34 at desired locations.

It will be understood that he disclosed invention will allow the user customize the disclosed invention by placing desired types of LEDs along the flat surfaces 34 to customize the system to favor a particular variety of plant or promote maturity or ripeness of flowers or fruit produced by the plant being illuminated with the disclosed system. Still further, it will be understood that the disclosed system will allow the user to easily upgrade or change the LEDs being used with the system, and thus take advantage of newer, more efficient LEDs or LEDs that produce light that favors certain kinds of plants.

As shown on FIG. 2 a transparent tube 38 is captured between the upper flange 22 and the lower flange 28. The transparent tube 28 protects the LEDs from foreign matter and personnel from burns from hot LEDs.

Referring once again to FIGS. 1 and 3, it will be understood that the disclosed invention will provide a hollow fastener 42 to attach the eye 14 to the support spacer 20 and to protect wiring that is routed to LEDs being used with the system. Also, FIG. 1 illustrates the use of conductive busses 44 that serve to connect wiring, e.g., power wiring, that has been through the grommet 42 to the LEDs or a control device for controlling power being delivered to the LEDS.

It will also be understood that the use of the elongated hollow metal tube 12 that is vertically suspended will draw heat from the LEDs, and thus act as a heat sink. Additionally the internal passage 40 of the elongated hollow metal tube 12 will heat air inside the internal passage 40. The heated air will rise and exit the elongated hollow metal tube 12 through the upper end 18 of the tube. The flow of air through the elongated hollow metal tube 12 will thus further aid in the cooling of the elongated hollow metal tube 12 and the attached LEDs. Still further, it will be understood that the main components of the disclosed invention may be attached to one another with fasteners 46, making construction of the disclosed invention very easy.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. An extendable system for suspendably supporting an array of illuminated LEDs within a greenhouse and removing heat generated from the array of illuminated LEDs positioned next to a plant, and permitting elongation of the system as the plant grows, the system comprising:
    an elongated hollow metal tube, the metal tube including a lower end having an opening and an upper end having an opening that extends from the upper end to the opening in the lower end;
    an upper flange that is secured against the opening in the upper end of the hollow metal tube, and
    a lower flange that is secured to the lower end of the hollow metal tube, the upper flange having at least one spoke that is attached to the upper flange and extends over and across at least a portion of the opening in the upper end of the hollow metal tube, and the lower flange having at least one spoke that extends across the opening in the lower end of the hollow metal tube, the at least one spoke of the upper flange being attached to an eye that allows suspension of the hollow metal tube from the upper flange in a vertical orientation, the hollow metal tube further having:
    an internal surface creating an internal passage that extends from the lower end to the upper end; and
    an external surface that extends from the lower end to the upper end;
    the external surface having a strip of LEDs that are attached to the external surface of the of hollow metal tube; and
    an electrical connector that is connected to the plurality of LEDs, so that supporting the system from the eye of upper flange positions the spoke that extends across the lower flange directly below the eye, so that when successive hollow metal tubes supporting LEDs supported from the spoke of the lower flange allows heat generated by illuminated LEDs mounted from the external surface of each of the successive hollow metal tube is transmitted to the internal passage as air within the internal passage of each successive metal tube becomes heated and rises through each of the successive hollow metal tubes, and so that air can enter the internal passage past the lower flange to permit air to flow through the internal passage, from the lower flange to the upper flange as the air within the internal passage becomes heated.

2. A system according to claim 1 wherein the eye is centered over the opening in the upper end of the hollow metal tube, so a pair of the hollow metal tubes vertically daisy chained together by attaching the eye attached to the upper flange of the metal tube to at least one spoke of the lower flange attached to another metal tube, so that air that becomes heated in a lower tube is favored to advance from the lower tube into the upper tube.

3. A system according to claim 1 and further comprising a generally transparent tube that extends over and is spaced apart from the hollow metal tube so that light from LEDs mounted from the hollow metal tube is transmitted through the generally transparent tube.

* * * * *